(12) United States Patent
Sinsky (10) Patent No.: US 7,068,950 B2
(45) Date of Patent: Jun. 27, 2006

(54) CORRECTING MISALIGNMENT BETWEEN DATA AND A CARRIER SIGNAL IN TRANSMITTERS

(75) Inventor: Jeffrey H. Sinsky, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 662 days.

(21) Appl. No.: 10/100,521

(22) Filed: Mar. 18, 2002

(65) Prior Publication Data

US 2004/0208635 A1 Oct. 21, 2004

(51) Int. Cl.
 *H04B 10/04* (2006.01)
(52) U.S. Cl. .................. 398/198; 398/154; 398/159
(58) Field of Classification Search .......... 398/66, 398/147, 81, 154, 155, 158, 159, 161, 188, 398/198; 328/150; 375/216, 24, 42; 385/11, 385/122
 See application file for complete search history.

(56) References Cited

U.S. PATENT DOCUMENTS

| | | | | |
|---|---|---|---|---|
| 4,513,249 A | * | 4/1985 | Baghdady | 327/356 |
| 4,546,322 A | * | 10/1985 | Crutcher | 329/308 |
| 5,367,536 A | * | 11/1994 | Tsujimoto | 375/269 |
| 5,418,815 A | * | 5/1995 | Ishikawa et al. | 375/216 |
| 6,487,352 B1 | * | 11/2002 | Sobiski et al. | 385/122 |
| 6,496,079 B1 | * | 12/2002 | Pleasant et al. | 332/103 |
| 6,671,079 B1 | * | 12/2003 | Fuller et al. | 359/264 |
| 2001/0030791 A1 | * | 10/2001 | Taneda | 359/181 |
| 2002/0149824 A1 | * | 10/2002 | Baulieu et al. | 359/158 |
| 2002/0176129 A1 | * | 11/2002 | Dinu et al. | 359/110 |
| 2002/0191260 A1 | * | 12/2002 | Bergano | 359/181 |
| 2002/0191261 A1 | * | 12/2002 | Notargiacomo et al. | 359/181 |

* cited by examiner

*Primary Examiner*—Christina Y. Leung (57) ABSTRACT

A device and technique for aligning an optical carrier signal (e.g., a soliton pulse train) with a data signal in a transmitter. According to the invention, the device is configured to analyze the radio frequency (RF) spectrum of the transmitter's output. In one implementation, the device evaluates the amount of energy in a certain frequency band located near a selected null of the RF spectrum. In another implementation, the device examines the shape of the RF spectrum within that frequency band. In either case, based on the analysis, the device adjusts the phase of the clock signal driving an electro-optic (E/O) modulator in the transmitter. Such adjustment reduces misalignment between the optical carrier signal and data resulting, e.g., from thermal effects in the E/O modulator. The device may be used, e.g., in long-haul optical transmission systems operating at 10 GBit/s.

36 Claims, 9 Drawing Sheets

CORRECTING MISALIGNMENT BETWEEN DATA AND A CARRIER SIGNAL IN TRANSMITTERS

BACKGROUND OF THE INVENTION

1. Field of the Invention

The present invention relates to communication equipment.

2. Description of the Related Art

Transmission of optical signals through fiber-optic networks is widely used in modern communication systems. In particular, long-haul, high data-rate wavelength division multiplexed (WDM) optical transmission is an important component of optical networking. One known way to accomplish long-haul transmission is by using soliton optical pulses. Due to special non-linear optical characteristics, a soliton pulse is less susceptible to chromatic and polarization mode dispersion than, e.g., a rectangular pulse. As such, soliton pulses can provide relatively low bit error rates and therefore high reliability for optical transmission.

Figure 1:
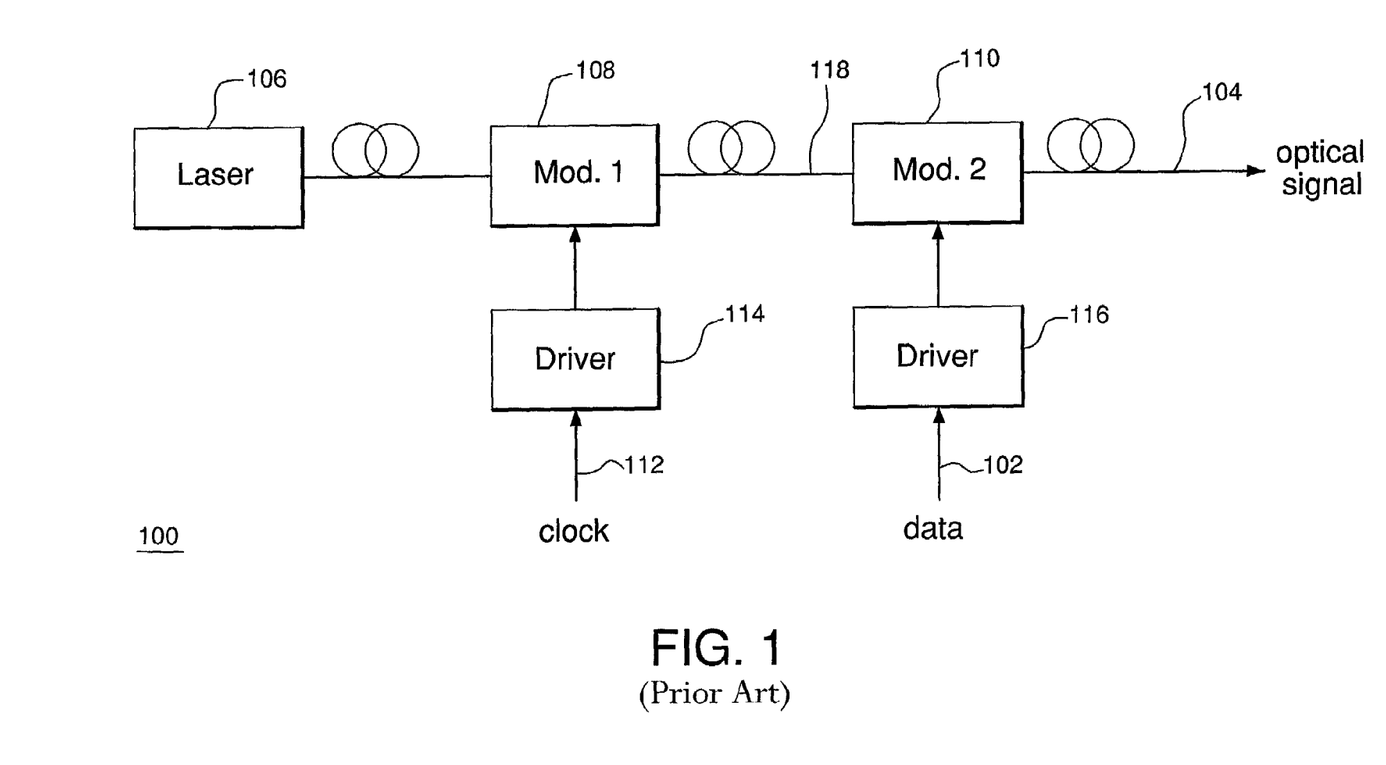
FIG. 1 shows a prior art system for transmitting data using an optical train of soliton pulses.

FIG. 1 shows a typical prior art system 100 for transmitting data using soliton pulses. System 100 is configured to convert an electronic data stream 102 into an optical signal 104. System 100 comprises a laser 106 that generates a continuous wave (CW) beam of light. This beam is fed into an optical fiber and delivered to a first electro-optic (E/O) modulator 108. Modulator 108, also called a pulse carver, is configured to generate an optical pulse train of soliton pulses based on control signals from a modulator driver 114 receiving an electrical input signal 112. Signal 112 may be a sine wave at a reference clock frequency. The output of modulator 108 is a soliton pulse train 118. Depending on the type of E/O modulator, the frequency of pulse train 118 may be equal the frequency of signal 112 or harmonically related to it. Pulse train 118, also called an optical carrier signal, is fed into a second E/O modulator 110 configured to modulate said pulse train based on control signals from a second modulator driver 116 receiving data stream 102. The output of modulator 110 is optical signal 104. In different types of transmitters not using soliton pulses, an optical carrier signal analogous to carrier signal 118 may be a different periodically modulated optical signal.

One problem with system 100 is that it requires synchronizing optical carrier signal 118 and electronic data stream 102. Such synchronization is difficult to maintain due to often occurring and, in general, poorly controllable phase drifts in E/O modulators. As a result of phase drift, carrier signal 118 and data stream 102 may become misaligned causing inaccuracies in signal 104.

Figure 2:
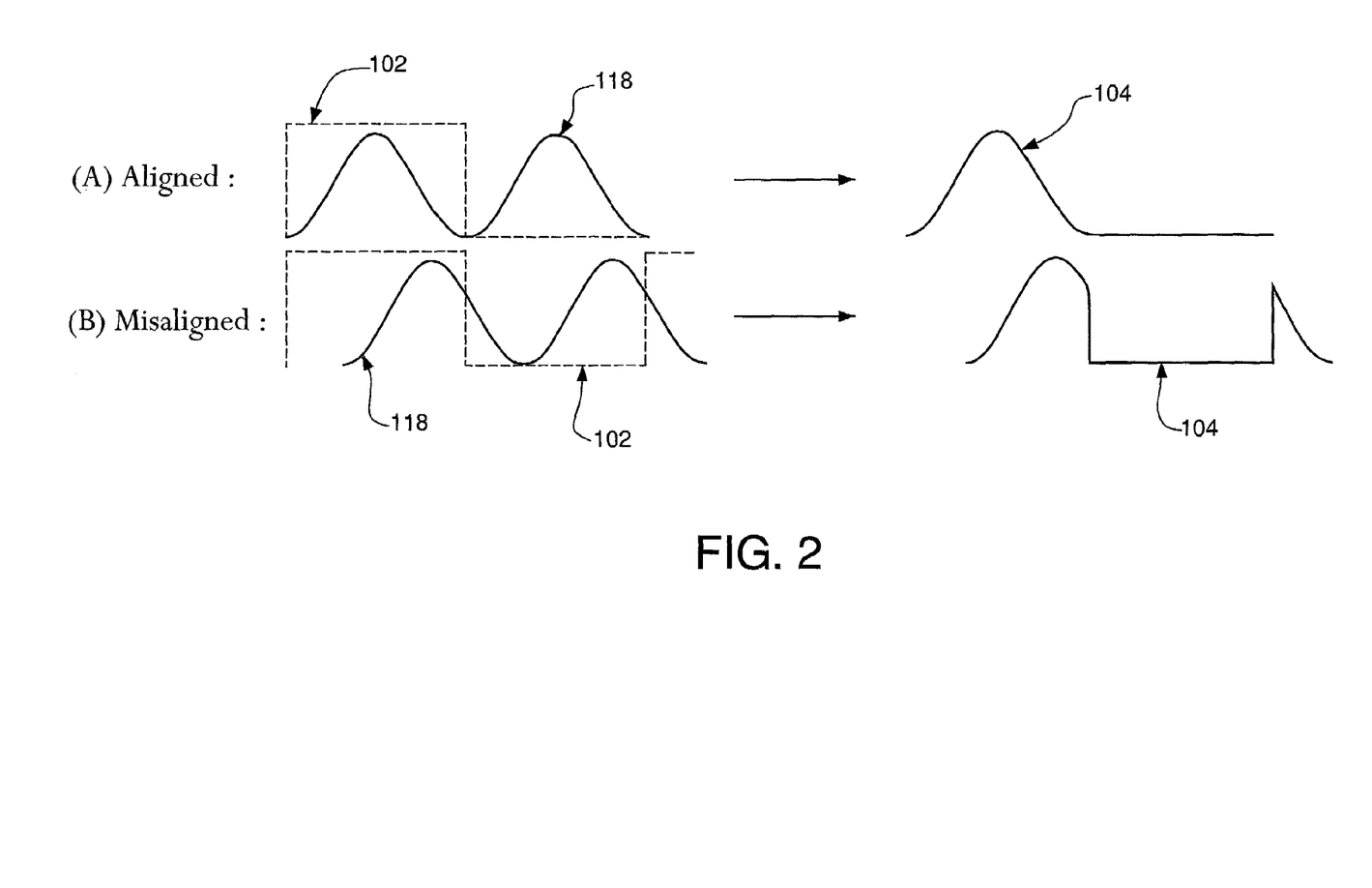
FIGS. 2A–B illustrate the effect of alignment between the carrier and data signals on the output signal in the system of FIG. 1.

FIGS. 2A–B illustrate the effect of misalignment of signals 102 and 118 on signal 104. As shown in FIG. 2A, when signal 102 is properly aligned with signal 118, modulator 110 transmits or blocks a carrier-signal pulse depending on the logical input to driver 116. However, as shown in FIG. 2B, when signals 102 and 118 are misaligned, the shape of a transmitted pulse is distorted and/or a pulse is not properly blocked. Distorted pulses do not have the correct soliton waveform required for propagation through a long-haul optical fiber. In addition, misalignment may result in the transmission of portions of carrier-signal pulses that ideally should not be transmitted. Both of these effects may result in increased bit error rates at a receiver.

SUMMARY OF THE INVENTION

In a preferred embodiment, the present invention is a device and technique for aligning an optical carrier signal (e.g., a soliton pulse train) with data in an optical transmitter. The device is configured to analyze the radio frequency (RF) spectrum of the transmitter's output. In one implementation, the device evaluates the amount of energy in a certain frequency band located near a selected null of the RF spectrum. In another implementation, the device examines the shape of the RF spectrum within that frequency band. In either case, based on the analysis, the device adjusts the phase of the clock signal driving an electro-optic (E/O) modulator in the transmitter. Such adjustment reduces misalignment between the optical carrier signal and the data resulting, e.g., from thermal effects in the E/O modulator. The device may be used, e.g., in long-haul optical transmission systems operating at 10 GBit/s.

According to one embodiment, the present invention is an apparatus for reducing misalignment between a carrier signal and a data signal, the apparatus comprising: (a) an analyzer configured (i) to analyze an input signal corresponding to the carrier and data signals, and (ii) to generate a control signal based on the analysis; and (b) a phase shifter configured to introduce a phase shift between the data signal and a clock signal using the control signal, wherein the carrier signal is based on the clock signal.

According to another embodiment, the present invention is a method of reducing misalignment between a carrier signal and a data signal, comprising the steps of: (i) analyzing a data-modulated signal corresponding to the carrier and data signals; and (ii) introducing a phase shift between the data signal and a clock signal based on the analysis, wherein the carrier signal is based on the clock signal.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Although the invention is particularly suitable for use with communications equipment, those skilled in the art can appreciate that the invention can be equally applied to other types of electrical and/or optical equipment.

Before embodiments of the present invention are described in detail, spectral properties of modulated optical signals, such as signal 104 of system 100, are briefly characterized.

Figure 3A:
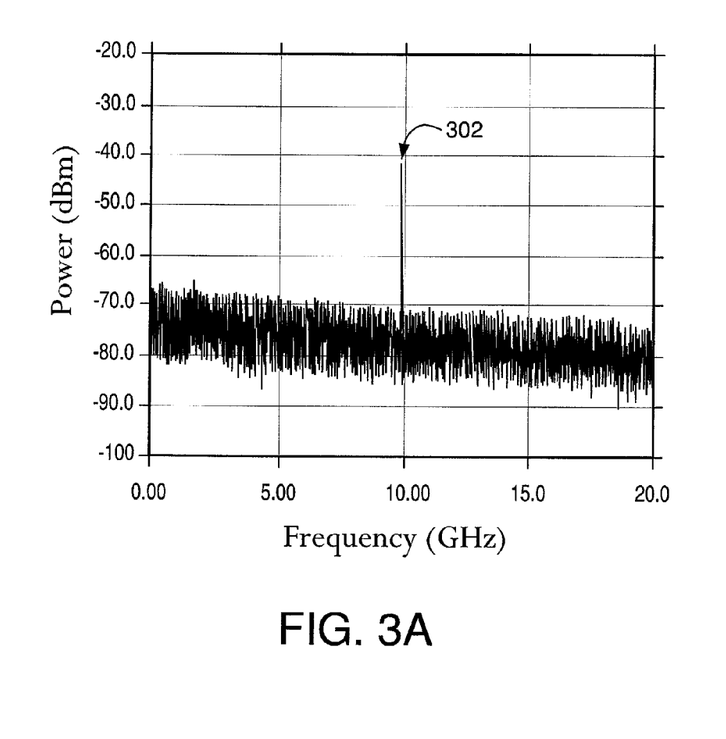
FIGS. 3A–B show representative spectra of a data-modulated signal produced using an optical pulse train and a pseudo-random data signal having a bit rate of about 10 GBit/s.
Figure 3B:
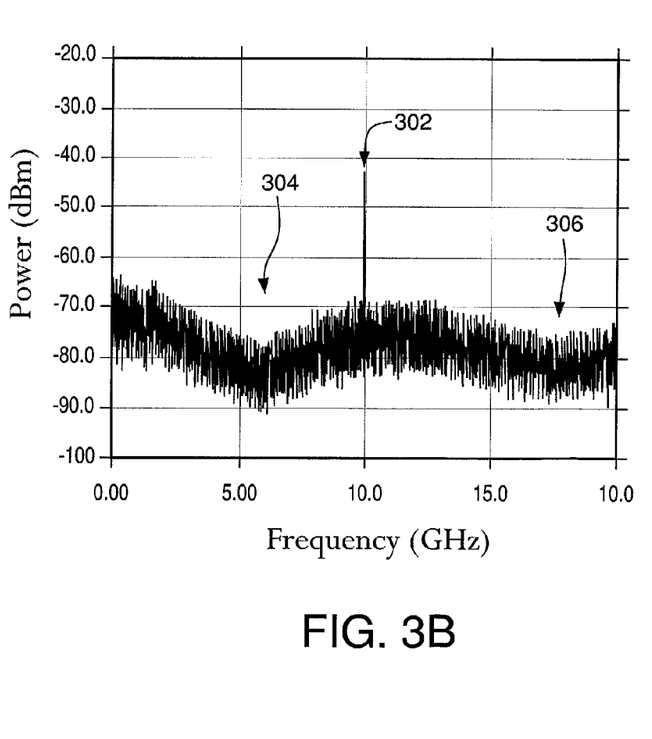

FIGS. 3A and 3B show two representative spectra of a data-modulated optical signal produced using an optical pulse train of soliton pulses and a pseudo-random non-return-to-zero (NRZ) data signal having a bit rate of about 10 GBit/s. FIG. 3A shows a spectrum of a data-modulated signal (e.g., signal 104 of system 100) when the carrier signal (e.g., signal 118) and the data signal (e.g., signal 102) are properly aligned. The spectrum exhibits a generally flat background with a sharp peak 302 corresponding to the modulation frequency, i.e., about 10 GHz.

FIG. 3B shows a typical spectrum of a data-modulated signal when the carrier and data signals are misaligned. As can be seen in FIG. 3B, the spectral background is no longer flat, but rather, exhibits spectral nulls, e.g., nulls 304 and 306 at about 6 and 17 GHz, respectively. The presence of one or more nulls in the spectrum is indicative of misalignment and may be used to detect and correct the same. The position, shape, and number of nulls depends on certain characteristics of the system, such as modulation frequency, pulse shape, data format, etc. For example, an optical pulse train of soliton pulses modulated with pseudo-random NRZ data having a bit rate of X GBit/s will have a spectral null at about 0.6 X GHz.

Figure 4:
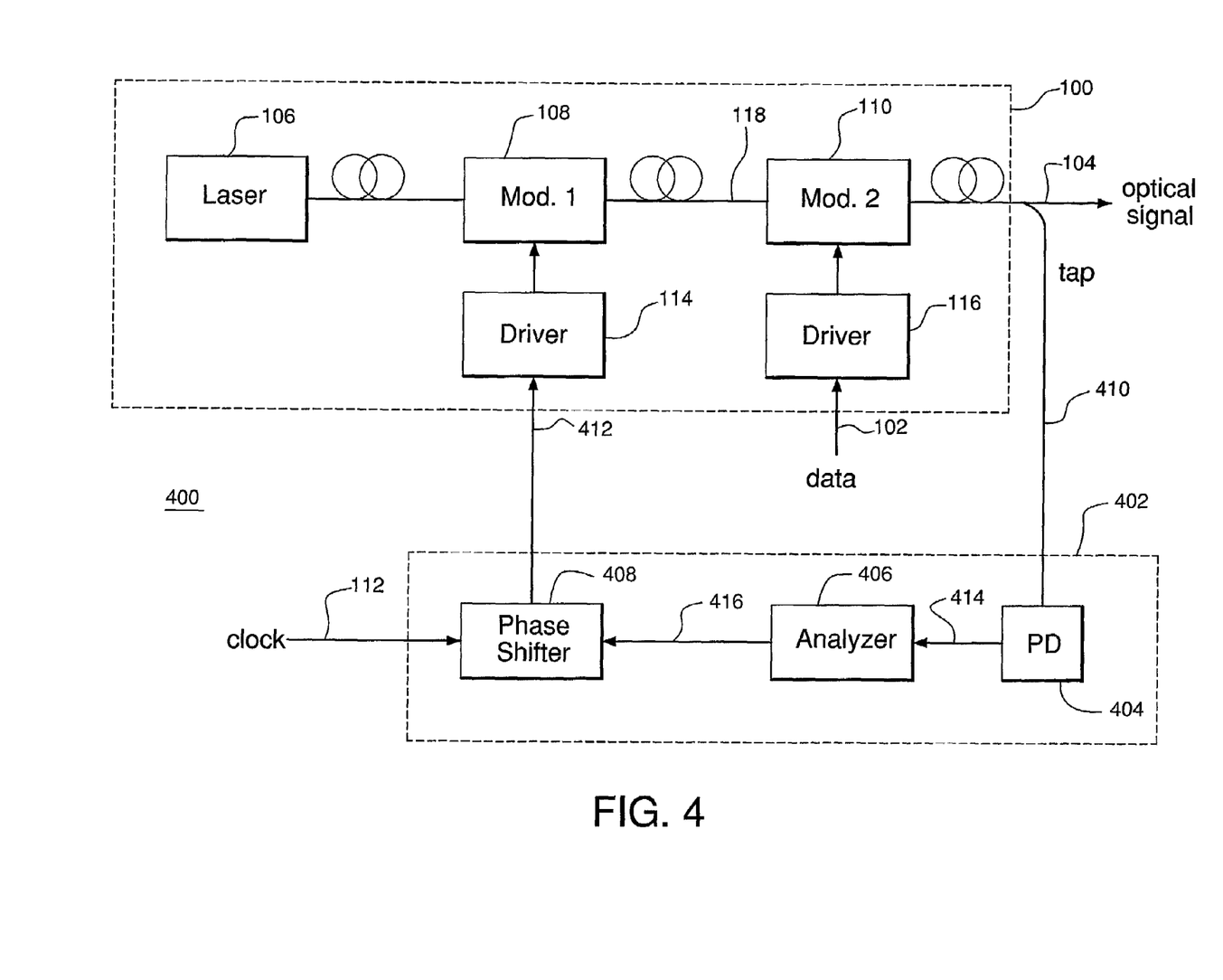
FIG. 4 shows a system for transmitting data according to one embodiment of the present invention.

FIG. 4 shows a transmission system 400 according to one embodiment of the present invention. System 400 comprises system 100 of FIG. 1 (already described above) and an alignment device 402. Device 402 is configured to generate feedback to modulator 108 of system 100 based on signal 104 to maintain carrier signal 118 in alignment with the input data signal (i.e., signal 102).

In one embodiment, device 402 comprises a photodetector 404, an analyzer circuit 406, and a voltage-controlled phase shifter 408. Phase shifter 408 may be, for example, PS-1401 available from Communication Techniques, Inc. of Wippany, N.J. A small fraction of the optical output of system 100 is delivered to photodetector 404 (e.g., a photodiode) using an optical tap. Photodetector 404 is configured to convert an optical tap signal 410 into an electrical signal 414 corresponding to optical signal 104. Analyzer 406 processes signal 414 and, based on the processing, generates a control signal 416 applied to phase shifter 408. Based on signal 416, phase shifter 408 adjusts the phase of clock signal 112 to generate a phase-shifted clock signal 412 applied to driver 114 of modulator 108. Using signal 412 instead of signal 112, e.g., helps to compensate for phase drifts of modulator 108 and maintain signals 118 and 102 in better alignment with each other.

Figure 5:
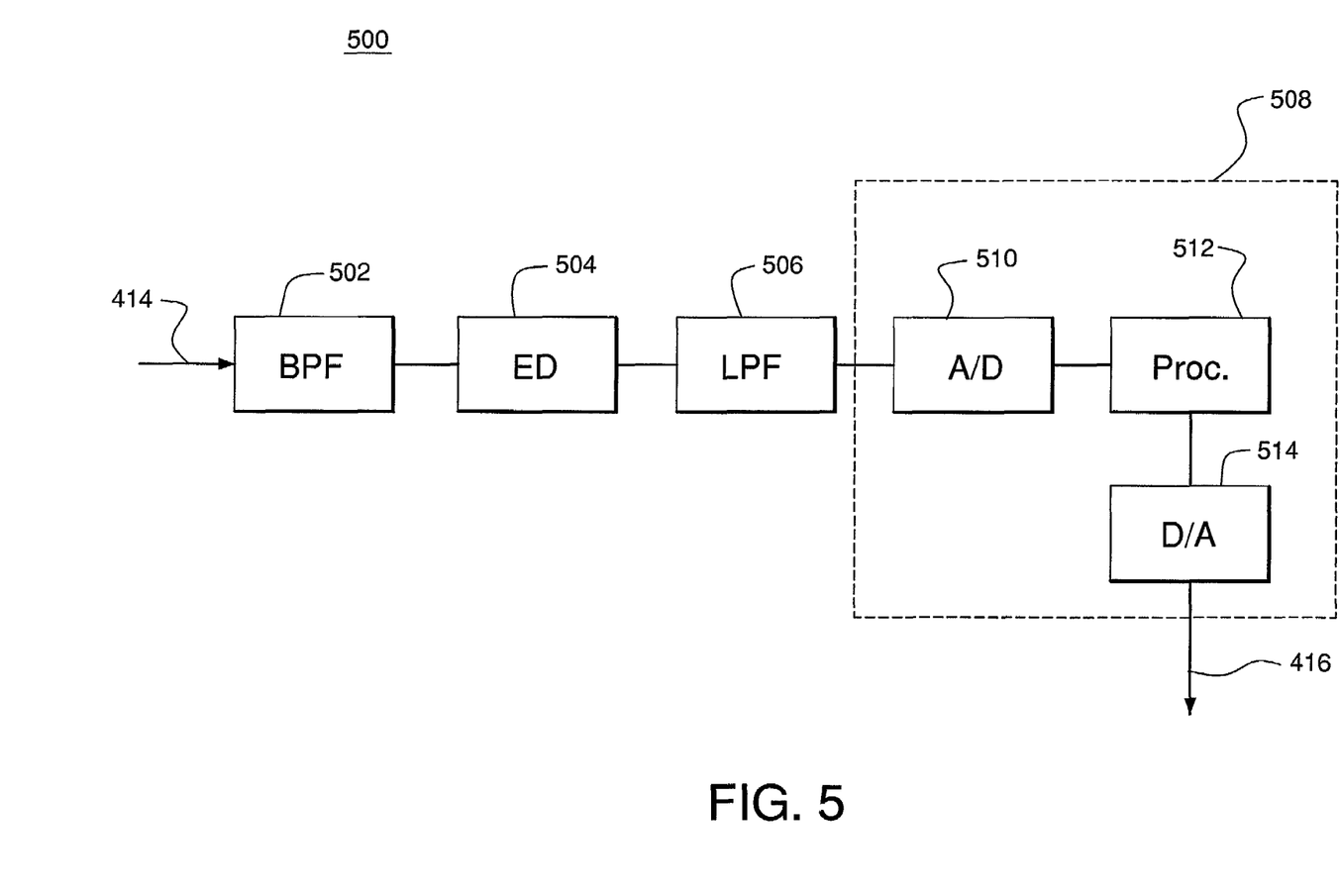
FIG. 5 shows a block diagram of a power analyzer that can be used in the system of FIG. 4 according to one embodiment of the present invention.

FIG. 5 shows a block diagram of a power analyzer 500 that can be used as analyzer 406 of system 400 according to one embodiment of the present invention. Power analyzer 500 is configured to generate control signal 416 based on the amount of energy in a certain band located near a spectral null. In one implementation, the band may be centered on null 304 (see FIG. 3B) and have a bandwidth of, e.g., 2 GHz. In a different implementation, a different bandwidth and/or a different null or combination of nulls may be used. In general, control signal 416 causes phase shifter 408 to introduce such phase difference between clock signals 112 and 412 as to maintain the amount of energy in the chosen band/combination of bands at a specific (e.g., maximum) level.

In one embodiment, power analyzer 500 comprises a bandpass filter (BPF) 502, an envelope detector (ED) 504, a low-pass filter (LPF) 506, and a control signal generating circuit 508. BPF 502 is configured to pass a portion of signal 414 corresponding to the pass band of the BPF. In one embodiment of the present invention, the pass band of BPF 502 is from about 5 GHz to about 7 GHz. In other embodiments, the pass band of BPF 502 may be configured differently depending, e.g., on the particular spectral null to be used.

ED 504 is configured to detect the radio frequency (RF) power in the pass band of BPF 502. In one embodiment, detector 504 may be a Schottky diode whose output voltage is proportional to the RF power in the pass band of BPF 502. The output signal of ED 504 is a relatively slow changing signal corresponding to the relatively slow phase drift (mostly thermal in nature) of modulator 108 of system 400. This signal is processed by LPF 506 and applied to circuit 508.

In one embodiment, circuit 508 may be an analog circuit. In another embodiment, circuit 508 may include digital circuitry. For example, as shown in FIG. 5, circuit 508 comprises an analog-to-digital converter (ADC) 510, a digital processor 512, and a digital-to-analog converter (DAC) 514. ADC 510 can be a relatively low speed ADC configured to measure the amplitude of the output of LPF 506. Based on the measured amplitude, processor 512 generates a digital control signal that is then converted by DAC 514 to analog control signal 416 applied to phase shifter 408.

Figure 6:
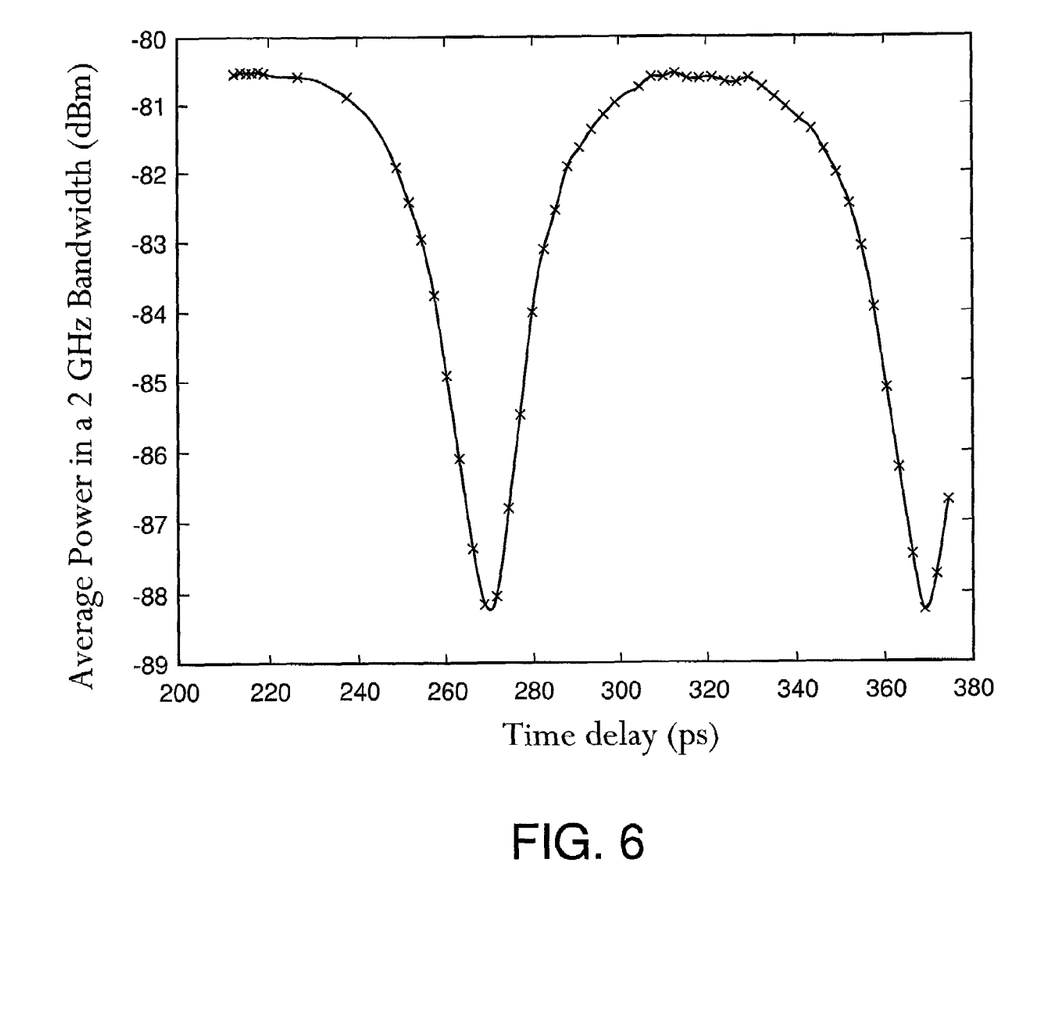
FIG. 6 illustrates the operation of the power analyzer of FIG. 5.

FIG. 6 further illustrates the operation of power analyzer 500 in a 10-GHz system. More specifically, FIG. 6 shows the dependence of the average power of signal 414 in the 2-GHz band centered on spectral null 304 on the relative delay between signals 102 and 112. Delaying clock signal 112 causes signal 118 to go in or out of alignment with signal 102. For example, at a delay of about 220 or 320 picoseconds (ps), signals 102 and 118 are properly aligned. As seen in FIG. 6, proper alignment corresponds to a relatively high power level (i.e., −80.5 dBm) in the 2-GHz band. Similarly, when clock signal 112 is delayed by about 270 or 370 ps, the power level is relatively low (i.e., −88.5 dBm) indicating that signals 102 and 118 are misaligned. Therefore, to maintain signals 102 and 118 in alignment, power analyzer 500 may configure phase shifter 408 by way of control signal 416 to apply a time delay, e.g., of about 220 ps to clock signal 112.

Figure 7:
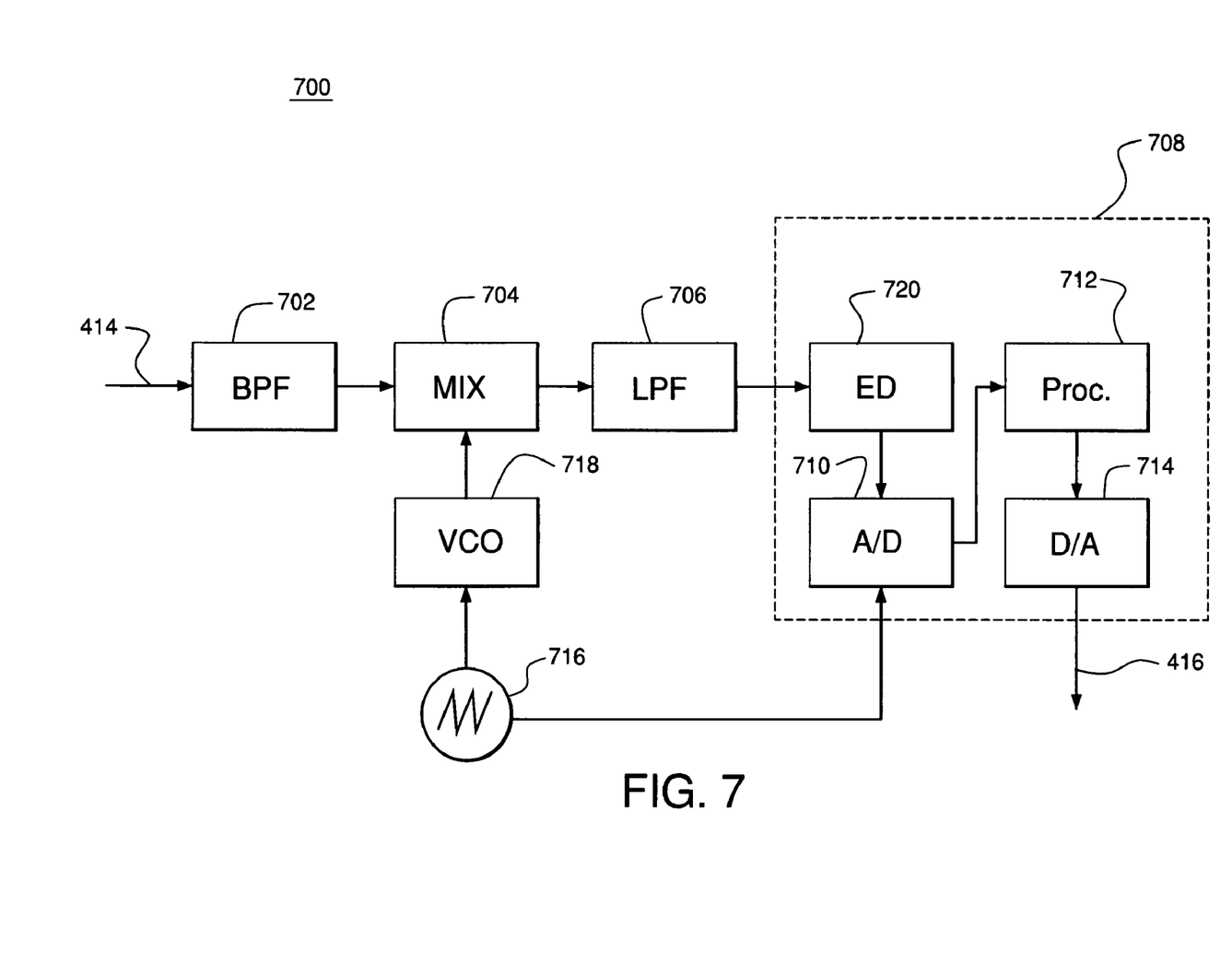
FIG. 7 shows a block diagram of a spectrum analyzer that can be used in the system of FIG. 4 according to another embodiment of the present invention.

FIG. 7 shows a block diagram of a spectrum analyzer 700 that can be used as analyzer 406 of system 400 according to another embodiment of the present invention. Spectrum analyzer 700 is configured to generate control signal 416 based on the spectral shape of signal 414 within a selected frequency range near a spectral null. In one implementation, the frequency range may be centered on null 304 (see FIG. 3B) and be within, e.g., ±3 GHz from the position of said null. In a different implementation, a different frequency range and/or a different null or combination of nulls may be used. In one embodiment, control signal 416 causes phase shifter 408 to introduce such phase difference between clock signals 112 and 412 so as to flatten the shape of the spectrum within the selected frequency range. In different embodiments, different shape criteria for the spectrum may be applied.

In one embodiment, spectrum analyzer 700 comprises a BPF 702, a mixer 704, an LPF 706, a control signal generating circuit 708, a sawtooth generator 716, and a voltage-controlled oscillator (VCO) 718. BPF 702 is configured to pass a portion of signal 414 corresponding to the pass band of the BPF. In one embodiment of the present invention employed in a 10-GHz system, the pass band of BPF 702 is from about 3 GHz to about 9 GHz. In other embodiments, the pass band of BPF 702 may be configured differently depending, e.g., on the particular frequency range and/or the spectral null to be used.

VCO 718 is configured to sweep across a selected frequency range, e.g., the pass band of BPF 702, using a sawtooth waveform from generator 716. Generator 716 also applies that waveform to circuit 708. Mixer 704 multiplies the outputs of BPF 702 and VCO 718 to place at DC a portion of the power spectrum of signal 414 corresponding to the instant frequency of VCO 718. That portion is passed onto circuit 708 via LPF 706 which filters out the relatively high-frequency components also present in the multiplied signal.

In one embodiment, circuit 708 comprises an envelope detector 720, an ADC 710, a digital processor 712, and a DAC 714. Detector 720 may be a detecting log amplifier configured to generate an output voltage proportional to the logarithm of in-band power of LPF 706. In one implementation, detector 720 may have a bandwidth and log-linear range of about 0–500 MHz and 90 dB, respectively. In other implementations, a different suitable detector may be used.

ADC 710 is configured to measure the amplitude of the output of detector 720. ADC 710 is further configured to measure the output voltage of generator 716. Based on these measurements, ADC 710 outputs, e.g., a pair of values corresponding to a frequency within the frequency range swept by VCO 718 and a power level of signal 414 at that frequency. Therefore in each frequency sweep, a power spectrum of signal 414 is measured and output to processor 712 which is configured to analyze the shape of that power spectrum using a set of selected criteria. Based on the analysis, processor 712 generates a digital control signal that is then converted by DAC 714 to analog control signal 416 applied to phase shifter 408.

Figure 8A:
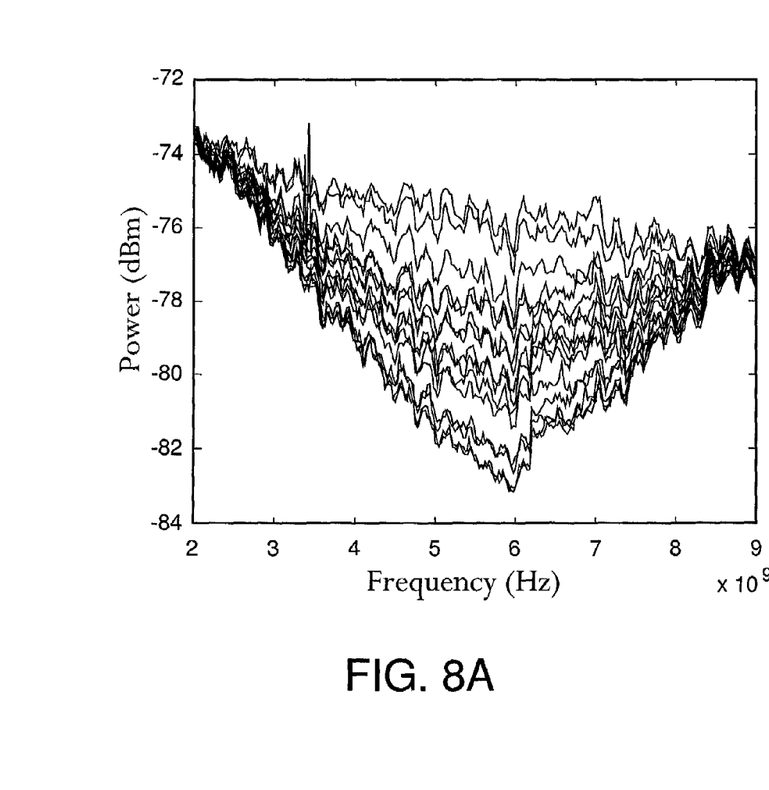
FIGS. 8A–B illustrate one type of analysis that can be implemented in the spectrum analyzer of FIG. 7 according to one embodiment of the present invention.
Figure 8B:
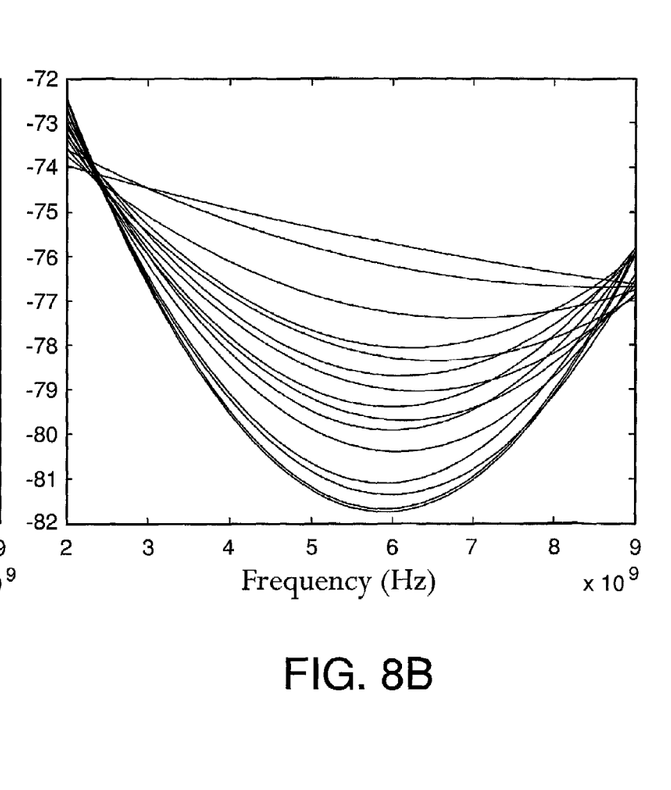

FIGS. 8A and 8B illustrate one type of analysis that can be implemented in processor 712 according to one embodiment of the present invention. FIG. 8A shows a representative set of power spectra received by processor 712 from ADC 710. Each spectrum, S(f), is approximated with a second order polynomial, e.g., using Equation (1) as follows:

$$S(f) = a_2 f^2 + a_1 f + a_0 \qquad (1)$$

A representative result of such approximations is shown in FIG. 8B. Processor 712 evaluates the concavity of a recent spectrum, e.g., using the value of $a_2$ corresponding to that spectrum. Based on that value, the processor derives a phase shift that needs to be applied to clock signal 112 by phase shifter 408 to flatten out the spectrum (i.e., to minimize $a_2$). Processor 712 then generates a digital control signal corresponding to the derived phase shift. That digital control signal is then converted to control signal 416 by DAC 714 and used by phase shifter 408 to generate phase-shifted clock signal 412.

Figure 9:
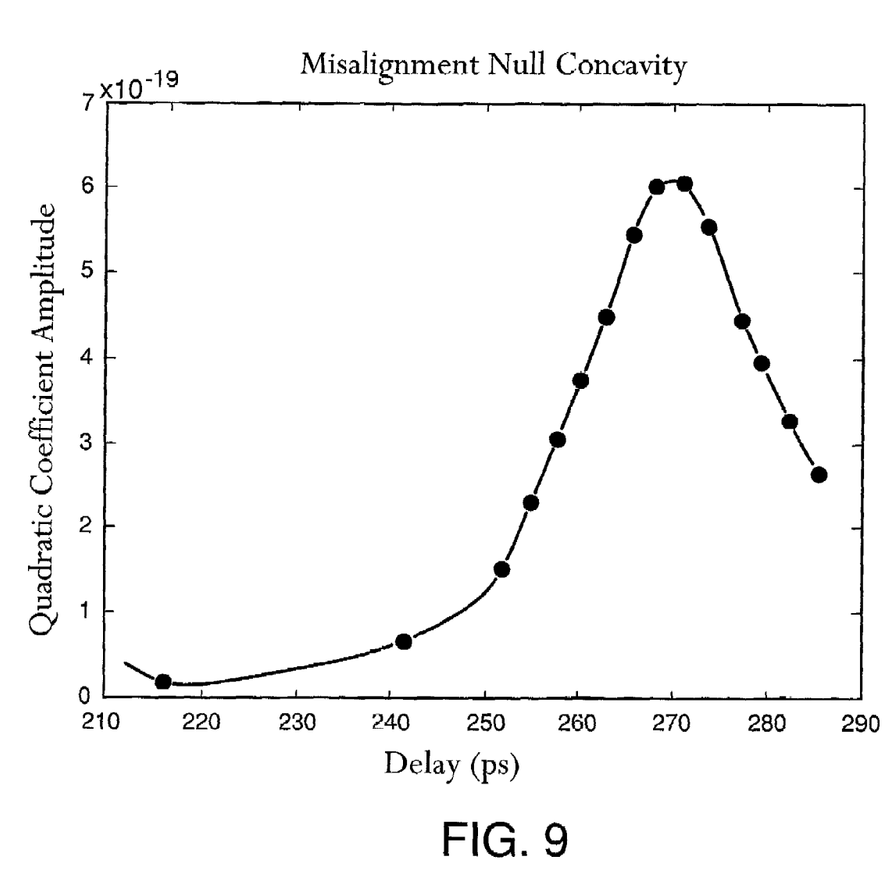
FIG. 9 illustrates the results of the analysis illustrated in FIG. 8.

FIG. 9 shows a set of $a_2$ values derived from the spectra of FIG. 8B as a function of time delay introduced by phase shifter 408 between clock signals 112 and 412. As explained earlier in the context of FIG. 6, delaying clock signal 112 causes signal 118 to go in or out of alignment with signal 102. For example in a 10-GHz system, at the delay of about 220 ps, signals 102 and 118 are properly aligned, while at the delay of about 270 ps, those signals are misaligned. FIG. 9 shows that proper alignment corresponds to low concavity of the spectrum (i.e., near zero) whereas misalignment results in relatively high concavity (i.e., about $6 \times 10^{-19}$ dBm/Hz$^2$). Therefore similar to the results of FIG. 6, to maintain signals 102 and 118 in alignment, spectrum analyzer 700 may configure phase shifter 408 by way of control signal 416 to apply a time delay, e.g., of about 220 ps to clock signal 112.

Spectrum analyzer 700 has the advantage of being less susceptible to gradual laser power fluctuations (e.g., that of laser 106 of system 100) than power analyzer 500, whereas power analyzer 500 can be implemented using fewer and/or less expensive components than spectrum analyzer 700. Therefore depending on the particular application, power analyzer 500 or spectrum analyzer 700 may be used. For example, it may be preferable to use power analyzer 500 with optical transmitters having relatively stable optical power levels. Likewise, spectrum analyzer 700 may be preferred in situations where laser power is relatively unstable.

Analyzer 406 of system 400 may be implemented using any suitable technology, e.g., as an ASIC or as discrete circuit elements. Alignment device 402 may be adapted to align signals having different data rates (e.g., 10, 20, or 40 GBit/s) and to accept clock signals represented by different waveforms. Furthermore, alignment device 402 may be configured for use with pure electronic circuits, in which situation photodetector 404 may be excluded. In different embodiments, photodetector 404 may be based on any suitable light-sensitive device, such as, for example, a photodiode, a phototransistor, a photogate, photo-conductor, a charge-coupled device, a charge-transfer device, or a charge-injection device. Similarly, as used in this specification, the term "light" refers to any suitable electromagnetic radiation in any wavelength that may be used in an optical transmission system, such as system 100. Modulators employed in system 100 may be, for example, lithium niobate Mach-Zhender type modulators operating at, e.g., 1550 nm. In various embodiments, digital processors 512 and 712 may be specialized processors designed for their respective circuits 508 and 708 or be part of a different circuit or device connected to analyzer 406. Furthermore, said digital processors may be configured to use look-up tables for generating their respective digital control signals. In some embodiments, a delay may be applied to the data signal (e.g., signal 102) instead of the clock signal (e.g., signal 112).

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

The invention claimed is:

1. An apparatus for reducing misalignment between a carrier signal and a data signal, the apparatus comprising:
    (a) an analyzer configured (i) to analyze spectral power of an input signal corresponding to the carrier and data signals, the spectral power being in a spectral band corresponding to a spectral null of the input signal, and (ii) to generate a control signal based on the analysis; and
    (b) a phase shifter configured to introduce a phase shift between the data signal and a clock signal using the control signal, wherein the carrier signal is based on the clock signal.

2. The invention of claim 1, wherein the analyzer comprises:
    (1) a bandpass filter characterized by a pass band, which includes the spectral band, wherein the input signal is applied to the bandpass filter;
    (2) an envelope detector configured to measure power of the input signal in the pass band;
    (3) a low pass filter configured to filter the output of the envelope detector; and
    (4) a circuit configured to generate the control signal based on said filtered output.

3. The invention of claim 2, wherein the circuit comprises:
    an analog-to-digital converter (ADC) configured to digitize the filtered output of the envelope detector;
    a digital processor configured to generate a digital control signal based on the digitized signal from the ADC; and
    a digital-to-analog converter configured to generate the control signal based on the digital control signal.

4. The invention of claim 1, wherein the analysis implemented in the analyzer is based on spectral shape of the input signal.

5. The invention of claim 4, wherein the control signal is generated based on the concavity of the spectral shape of the input signal corresponding to a spectral null in the input signal.

6. The invention of claim 4, wherein the analyzer comprises:
    (1) a bandpass filter configured to filter the input signal;
    (2) a voltage-controlled oscillator (VCO) configured to generate a variable frequency signal;
    (3) a mixer configured to multiply the output of the bandpass filter and the variable frequency signal;
    (4) a low pass filter configured to filter the output of the mixer to produce a filtered signal corresponding to the spectral shape of the input signal; and
    (5) a circuit configured to generate the control signal based on said filtered signal.

7. The invention of claim 6, wherein the analyzer further comprises a sawtooth generator configured to drive the VCO and provide a reference signal to the circuit, wherein the reference signal corresponds to the frequency of the variable frequency signal and the circuit uses the reference signal to generate the control signal.

8. The invention of claim 6, wherein the circuit comprises:
    an amplifier, configured to generate an output voltage corresponding to the power of the filtered signal;
    an analog-to-digital converter configured to digitize the output of the amplifier;
    a digital processor configured to generate a digital control signal based on the digitized output of the amplifier; and
    a digital-to-analog converter configured to generate the control signal based on the digital control signal.

9. The invention of claim 1, further comprising a photo-detector configured to (i) receive a data-modulated optical signal corresponding to the carrier and data signals and (ii) generate the input signal.

10. The invention of claim 9, further comprising an optical transmitter configured to generate the data-modulated optical signal based on the data signal and the clock signal.

11. The invention of claim 10, wherein the optical transmitter comprises:
    a first driver configured to generate a first driving signal based on the clock signal;
    a first electro-optic (E/O) modulator configured to receive an optical input from a laser and to modulate said optical input based-on the first driving signal to produce the carrier signal;
    a second driver configured to generate a second driving signal based on the data signal; and
    a second E/O modulator configured to receive the carrier signal and to modulate said carrier signal based on the second driving signal to produce the data-modulated optical signal.

12. The invention of claim 11, wherein:
    the optical input is a continuous wave (CW) signal; and
    the apparatus further comprises the laser.

13. The invention of claim 9, wherein the phase shifter is configured to shift the phase of the clock signal and apply the shifted clock signal to the optical transmitter.

14. The invention of claim 1, wherein the carrier signal comprises an optical train of soliton pulses.

15. The invention of claim 1, wherein the control signal is generated such as to maximize said spectral power.

16. The invention of claim 1, wherein the spectral band is located between about 0.5 $f$GHz and about 0.7 $f$Ghz, where $f$Gbit/s is a bit rate of the data-modulated signal.

17. A method of reducing misalignment between a carrier signal and a data signal, comprising the steps of:
    (i) analyzing spectral power of a data-modulated signal corresponding to the carrier and data signals, the spectral power being in a spectral band corresponding to a spectral null of the data-modulated sianal; and
    (ii) introducing a phase shift between the data signal and a clock signal based on the analysis, wherein the carrier signal is based on the clock signal.

18. The invention of claim 17, wherein step (i) comprises the steps of:
    (1) applying the data-modulated signal to a bandpass filter characterized by a pass band, which includes the spectral band;
    (2) measuring power of the data-modulated signal in the pass band using an envelope detector;
    (3) filtering the output of the envelope detector using a low pass filter; and
    (4) generating a control signal based on said filtered output.

19. The invention of claim 17, wherein step (i) comprises the step of generating a control signal based on the analysis; and step (ii) comprises the step of introducing the phase shift between the data signal and the clock signal based on the control signal.

20. The invention of claim 17, wherein step (i) comprises the step of analyzing spectral shape of the data-modulated signal.

21. The invention of claim 20, wherein step (i) comprises the step of analyzing the concavity of a spectral null in the data-modulated signal.

22. The invention of claim 21, wherein step (ii) comprises the step of minimizing said concavity.

23. The invention of claim 20, wherein step (i) comprises the steps of:
  (1) filtering the data-modulated signal using a bandpass filter;
  (2) generating a variable frequency signal;
  (3) multiplying the output of the bandpass filter and the variable frequency signal;
  (4) filtering the result of multiplication to produce a filtered signal corresponding to the spectral shape of the data-modulated signal; and
  (5) generating a control signal based on said filtered signal.

24. The invention of claim 17, further comprising the step of:
  (iii) generating the carrier signal using the clock signal.

25. The invention of claim 24, wherein step (iii) comprises the steps of generating a phase-shifted clock signal and using the phase-shifted clock signal to generate the carrier signal.

26. The invention of claim 17, wherein the carrier signal comprises an optical train of soliton pulses.

27. The invention of claim 17, wherein step (ii) comprises the step of maximizing said spectral power.

28. The invention of claim 17, wherein the spectral band is located between about 0.5 $f$GHz and about 0.7 $f$Ghz, where $f$Gbit/s is a bit rate of the data-modulated signal.

29. A method of reducing misalignment between a carrier signal and a data signal, comprising the steps of:
  (i) analyzing concavity of a spectral null in a data-modulated signal corresponding to the carrier and data signals; and
  (ii) introducing a phase shift between the data signal and a clock signal based on the analysis, wherein the carrier signal is based on the clock signal.

30. The invention of claim 29, wherein the spectral null corresponds to a spectral band located between about 0.5$f$GHz and about 0.7 $f$Ghz, where $f$Gbit/s is a bit rate of the data-modulated signal.

31. The invention of claim 29, wherein step (ii) comprises the step of minimizing said concavity.

32. The invention of claim 29, wherein step (i) comprises the steps of:
  (1) filtering the data-modulated signal using a bandpass filter;
  (2) generating a variable frequency signal;
  (3) multiplying the output of the bandpass filter and the variable frequency signal;
  (4) filtering the result of multiplication to produce a filtered signal corresponding to the spectral shape of the data-modulated signal; and
  (5) generating a control signal based on said filtered signal.

33. An apparatus for reducing misalignment between a carrier signal and a data signal, the apparatus comprising:
  (a) an analyzer configured (i) to analyze concavity of a spectral null in an input signal corresponding to the carrier and data signals, and (ii) to generate a control signal based on the analysis; and
  (b) a phase shifter configured to introduce a phase shift between the data signal and a clock signal using the control signal, wherein the carrier signal is based on the clock signal.

34. The invention of claim 33, wherein the spectral null corresponds to a spectral band located between about 0.5 $f$GHz and about 0.7 $f$Ghz, where $f$Gbit/s is a bit rate of the input signal.

35. The invention of claim 33, wherein the control signal is generated such as to minimize said concavity.

36. The invention of claim 33, wherein the analyzer comprises:
  (1) a bandpass filter configured to filter the input signal;
  (2) a voltage-controlled oscillator (VCO) configured to generate a variable frequency signal;
  (3) a mixer configured to multiply the output of the bandpass filter and the variable frequency signal;
  (4) a low pass filter configured to filter the output of the mixer to produce a filtered signal corresponding to the spectral shape of the input signal; and
  (5) a circuit configured to generate the control signal based on said filtered signal.

* * * * *